US012291330B2

(12) United States Patent
Albright

(10) Patent No.: US 12,291,330 B2
(45) Date of Patent: May 6, 2025

(54) AIRCRAFT WING HAVING A TRUSS SYSTEM FOR COUPLING A CENTER WING SECTION TO AN OUTBOARD WING SECTION

(71) Applicant: The Boeing Company, Arlington, VA (US)

(72) Inventor: Justin Grey Albright, La Mirada, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/232,808

(22) Filed: Aug. 10, 2023

(65) Prior Publication Data
US 2025/0051001 A1 Feb. 13, 2025

(51) Int. Cl.
*B64C 3/18* (2006.01)
*B64C 1/14* (2006.01)
*B64C 3/32* (2006.01)
*B64C 1/26* (2006.01)

(52) U.S. Cl.
CPC .............. *B64C 3/18* (2013.01); *B64C 1/1446* (2013.01); *B64C 3/32* (2013.01); *B64C 1/26* (2013.01)

(58) Field of Classification Search
CPC ................................ B64C 1/1446; B64C 1/26
See application file for complete search history.

(56) References Cited

U.S. PATENT DOCUMENTS

| | | | | |
|---|---|---|---|---|
| 2,186,221 A * | 1/1940 | Weymouth | ................ | B64C 9/22 244/210 |
| 8,322,656 B2 | 12/2012 | Pahl | | |
| 8,348,196 B2 * | 1/2013 | Campana | ................ | B64C 1/26 244/123.1 |
| 8,348,197 B2 * | 1/2013 | Lobo Barros | ............. | B64C 3/18 244/123.7 |
| 9,221,532 B2 * | 12/2015 | Karem | ....................... | B64C 1/26 |
| 11,613,341 B2 | 3/2023 | Behzadpour | | |
| 2003/0222170 A1 | 12/2003 | Wojciechowski | | |
| 2010/0108810 A1 | 5/2010 | Lobo Barros | | |
| 2013/0062467 A1 | 3/2013 | Soenarjo | | |

(Continued)

FOREIGN PATENT DOCUMENTS

RU 2556268 7/2015
WO WO2013137915 9/2013

OTHER PUBLICATIONS

EPO, Extended European Search Report, serial No. 24188553, dated Oct. 12, 2024.
Gabbert Bill et al,"Wing box replacements in the USFS C-130s—Fire Aviation", pp. 1-10, Jan. 11, 2014, available at <https://fireaviation.com/2014/01/11/wing-box-replacements-in-the-usfs-c-130s/>.

(Continued)

*Primary Examiner* — Richard Green

(57) ABSTRACT

An aircraft wing includes a center wing section having a continuous structure that spans beyond a first side of an aircraft fuselage and beyond a second side of the aircraft fuselage. The aircraft wing also includes a first outboard wing section attached to a first end of the center wing section by a first truss system that is accessible via a first closeout panel. The first end of the center wing section in on the first side of the aircraft fuselage. The aircraft wing also includes a second outboard wing section attached to a second end of the center wing section by a second truss system that is accessible via a second closeout panel. The second end of the center wing section is on the second side of the aircraft fuselage.

20 Claims, 12 Drawing Sheets

(56) References Cited

U.S. PATENT DOCUMENTS

| | | | |
|---|---|---|---|
| 2016/0107740 A1* | 4/2016 | Knopp | B64C 1/1446 49/506 |
| 2022/0003306 A1 | 2/2022 | Behzadpour | |
| 2022/0033060 A1 | 2/2022 | Behzadpour | |

OTHER PUBLICATIONS

Michael C. Y. Niu, "Airframe Structural Design," pp. 247-302, Jan. 1, 1988.

* cited by examiner

AIRCRAFT WING HAVING A TRUSS SYSTEM FOR COUPLING A CENTER WING SECTION TO AN OUTBOARD WING SECTION

FIELD

The present disclosure generally relates to aircrafts, and more particularly, to a wing structure for an aircraft.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Low-wing aircrafts typically include a structural joint (e.g., a wing joint) proximate to a side of a fuselage where a center section of an aircraft wing is connected to an aircraft wing box. The aircraft wing box typically is a load-carrying structure of the aircraft wing that serves as an attachment point for other wing components, such as leading edge flaps, trailing edge flaps, and wing-tip devices. Because the aircraft wing box is proximate to the fuselage, the center section of the aircraft wing may be relatively small. As a result, a lot of internal structure and systems related to the engine and fuel management is outboard of the center section of the aircraft wing, where space is relatively confined.

SUMMARY

The present application is directed to an improved aircraft wing structure. In particular, according to the techniques described herein, a center section of an aircraft wing has a continuous structure, and a wing joint of the aircraft wing is outboard an engine. By constructing the aircraft wing such that the wing joint is outboard the engine, internal structure and systems related to the engine and fuel management can be included in the center section of the aircraft wing. Additionally, by constructing the aircraft wing such that the wing joint is outboard the engine, there are less interfaces (e.g., stringers) that need to carry the load through an outboard wing section, which can lead to less fasteners. In some embodiments, the center section of the aircraft wing can have a large opening and closeout panel that enables aircraft personnel to have access to a very large portion of the center section.

The aircraft wing can be attached to an aircraft fuselage using a self-aligning interface. Primary loads for the aircraft wing to the fuselage are vertical (e.g., in the "up" direction) with maneuvering loads and landing loads acting as primary drivers. The reverse maneuvering loads associated with the aircraft fuselage are less than the primary loads for the aircraft wing. As a result, the self-aligning interface can transfer the large load through features (e.g., structural design features) of the interface as opposed to solely relying on fasteners.

In one aspect, the present application discloses an aircraft structure. The aircraft structure includes an aircraft wing. The aircraft wing includes a center wing section having a continuous structure that spans beyond a first side of an aircraft fuselage and beyond a second side of the aircraft fuselage. The aircraft wing also includes a first outboard wing section attached to a first end of the center wing section by a first truss system that is accessible via a first closeout panel. The first end of the center wing section in on the first side of the aircraft fuselage. The aircraft wing also includes a second outboard wing section attached to a second end of the center wing section by a second truss system that is accessible via a second closeout panel. The second end of the center wing section is on the second side of the aircraft fuselage.

In another aspect, the present application discloses a method of fabricating an aircraft structure. The method includes attaching a first outboard wing section of an aircraft wing to a first end of a center wing section of the aircraft wing by a first truss system that is accessible via a first closeout panel. The center wing section has a continuous structure that spans beyond a first side of an aircraft fuselage and beyond a second side of the aircraft fuselage. The first end of the center wing section is on the first side of the aircraft fuselage. The method also includes attaching a second outboard wing section of the aircraft wing to a second end of the center wing section by a second truss system that is accessible via a second closeout panel. The second end of the center wing section is on the second side of the aircraft fuselage. The method also includes mounting a first engine onto the center wing section and mounting a second engine onto the center wing section. The first outboard wing section is outboard the first engine, and the second outboard wing section is outboard the second engine.

In another aspect, the present application discloses an aircraft. The aircraft includes a fuselage and an aircraft wing. The aircraft wing includes a center wing section having a continuous structure that spans beyond a first side of the fuselage and beyond a second side of the fuselage. The aircraft wing also includes a first outboard wing section attached to a first end of the center wing section by a first truss system that is accessible via a first closeout panel. The first end of the center wing section is on the first side of the aircraft fuselage. The aircraft wing also includes a second outboard wing section attached to a second end of the center wing section by a second truss system that is accessible via a second closeout panel. The second end of the center wing section is on the second side of the aircraft fuselage. The aircraft also includes a first engine mounted onto the center wing section and a second engine mounted onto the center wing section. The first outboard wing section is outboard the first engine, and the second outboard wing section is outboard the second engine.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

A more complete understanding of embodiments of the present application may be derived by referring to the detailed description and claims when considered in conjunction with the following figures, wherein like reference numbers may refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
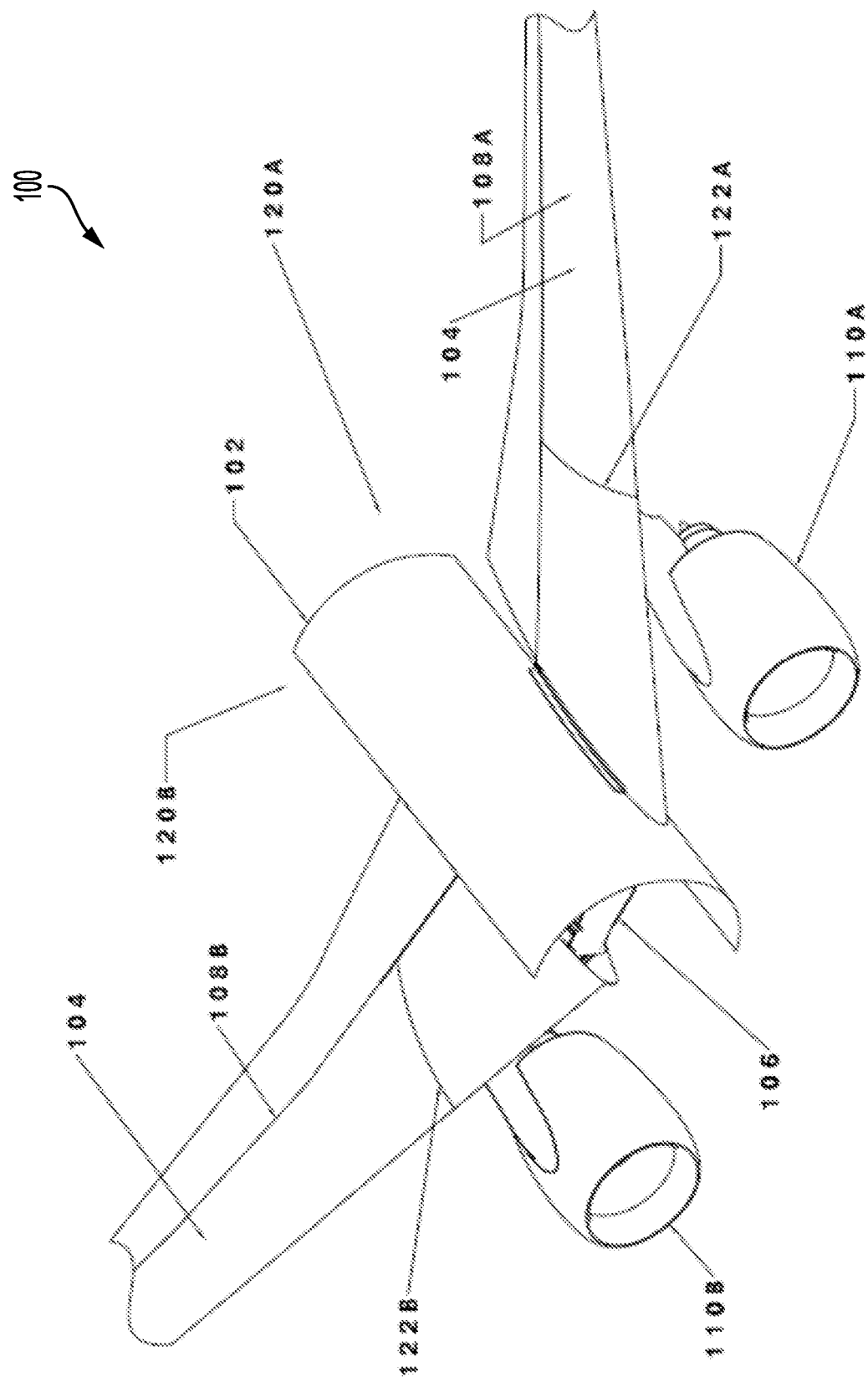
FIG. 1 illustrates an aircraft that includes a fuselage and an aircraft wing with a continuous center section expanding beyond the fuselage, according to an exemplary embodiment.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features may be designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, engines are illustrated and associated with reference number 110. When referring to a particular one of the engines, such as the engine 110A, the distinguishing letter "A" is used. However, when referring to any arbitrary one of the engines or to the engines as a group, the reference number 110 may be used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Referring to FIG. 1, an aircraft 100 that includes a fuselage and an aircraft wing with a continuous center section expanding beyond the fuselage is illustrated, in accordance with an exemplary embodiment. In the example of FIG. 1, the aircraft 100 is a low-wing aircraft. For example, the aircraft 100 has a wing below the fuselage.

To illustrate, the aircraft 100 includes an aircraft fuselage 102. The aircraft fuselage 102 can correspond to a main body section of the aircraft 100. The aircraft fuselage 102 can hold crew, passengers, cargo, etc. The aircraft 100 also includes an aircraft wing 104. As depicted in FIG. 1, the aircraft wing 104 is attached to the aircraft fuselage 102 in such a manner that the aircraft wing 104 is below the aircraft fuselage 102.

The aircraft wing 104 includes a center wing section 106. The center wing section 106 has a continuous structure that spans beyond a first side 120A of the aircraft fuselage 102 and beyond a second side 120B of the aircraft fuselage 102. The aircraft wing 104 also includes a first outboard wing section 108A attached to a first end 122A of the center wing section 106, and a second outboard wing section 108B attached to a second end 122B of the center wing section 106. The first end 122A of the center wing section 106 is on the first side 120A of the aircraft fuselage 102, and the second end 122B of the center wing section 106 is on the second side 120B of the aircraft fuselage 102. As described below, the first outboard wing section 108A can be attached to the first end 122A of the center wing section 106 by a first truss system (e.g., the first truss system 500A of FIG. 7) that is accessible via a first closeout panel (e.g., the closeout panel 302A of FIG. 3), and the second outboard wing section 108B can be attached to the second end 122B of the center wing section 106 by a second truss system (e.g., the second truss system 500B of FIG. 7) that is accessible via a second closeout panel (e.g., the closeout panel 302B of FIG. 4).

The aircraft 100 also includes a first engine 110A mounted onto the center wing section 106 of the aircraft wing 104 and a second engine 110B mounted onto the center wing section 106 of the aircraft wing 104. Thus, the first outboard wing section 108A is outboard the first engine 110A, and the second outboard wing section 108B is outboard the second engine 110B.

By constructing the aircraft wing 104 such that the outboard wing sections 108 are outboard the engines 110, internal structure and systems related to the engines 110 and fuel management can be included within the continuous center wing section 106 of the aircraft wing 104. As described below, the center wing section 106 can have a large opening and closeout panel that enables aircraft personnel to have access to a very large portion of the center wing section 106 to perform maintenance operations on different aircraft systems. Additionally, by using a continuous center wing section 106 that extends beyond the aircraft fuselage 102, there are less interfaces (e.g., stringers) that need to carry the load through the outboard wing sections 108, which can lead to less fasteners. For example, because of the continuous nature of the center wing section 106, the center wing section 106 can carry a relatively large load with a reduced amount of fasteners compared to a smaller center wing section that does not extend beyond the aircraft fuselage 102.

Figure 2:
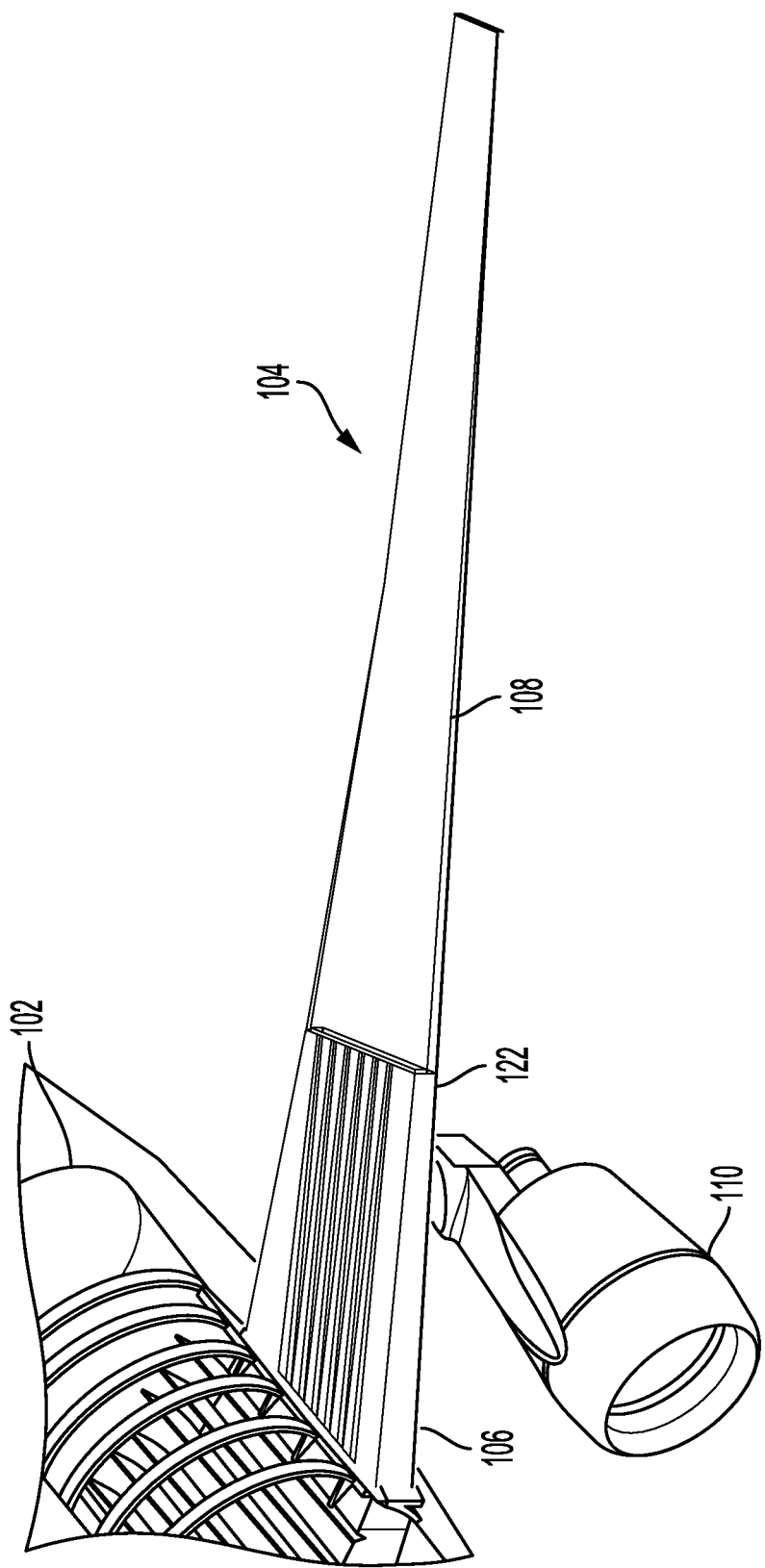
FIG. 2 illustrates a portion of an aircraft wing, according to an exemplary embodiment.

Referring to FIG. 2, a portion of the aircraft wing 104 is illustrated, in accordance with an exemplary embodiment. The portion of the aircraft wing 104 in FIG. 2 can correspond to the portion of the aircraft wing 104 on the first side 120A of the aircraft fuselage 102 or the portion of the aircraft wing 104 on the second side 120B of the aircraft fuselage 102.

In FIG. 2, the center wing section 106 of the aircraft wing 104 has a continuous structure that spans beyond the aircraft fuselage 102. The outboard wing section 108 is attached to the end 122 of the center wing section 106. As described below with respect to FIG. 5, the outboard wing section 108 can be attached to the end 122 of the center wing section 106 by a truss system 500 that is accessible via a closeout panel, such as the closeout panel 302A of FIG. 3 or the closeout panel 302B of FIG. 4.

By constructing the aircraft wing 104 such that the outboard wing sections 108 are outboard the engines 110, internal structure and systems related to the engines 110 and fuel management can be included within the continuous center wing section 106 of the aircraft wing 104. As described below, the center wing section 106 can have a large opening and closeout panel that enables aircraft personnel to have access to a very large portion of the center wing section 106 to perform maintenance operations on different aircraft systems. Additionally, by using a continuous center wing section 106 that extends beyond the aircraft fuselage 102, there are less interfaces (e.g., stringers) that need to carry the load through the outboard wing sections 108, which can lead to less fasteners. For example, because of the continuous nature of the center wing section 106, the center wing section 106 can carry a relatively large load with a reduced amount of fasteners compared to a smaller center wing section that does not extend beyond the aircraft fuselage 102.

Figure 3:
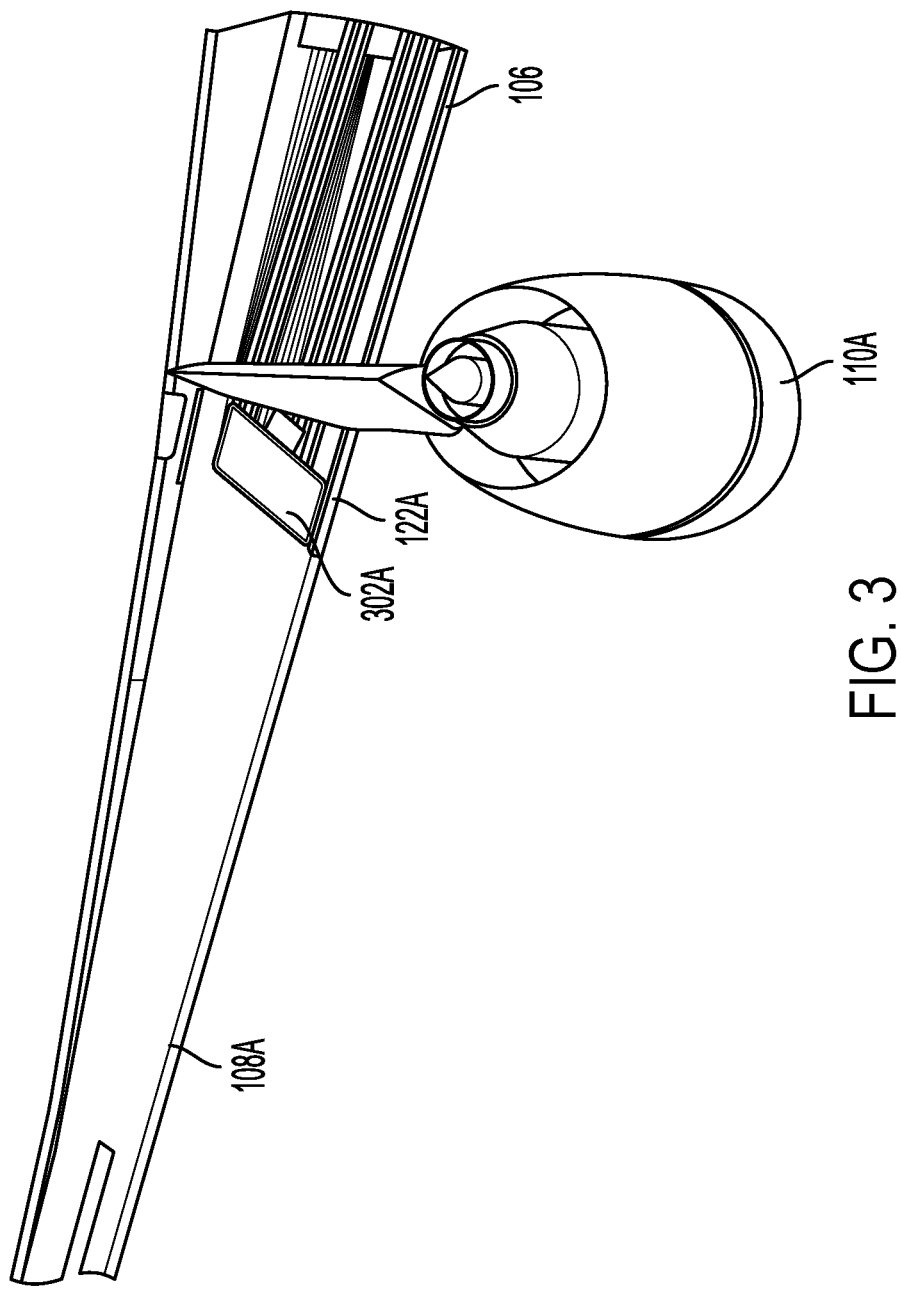
FIG. 3 illustrates a bottom portion of an aircraft wing on a first side of a fuselage, according to an exemplary embodiment.

Referring to FIG. 3, a bottom portion of the aircraft wing 104 on the first side 120A of the aircraft fuselage 102 is illustrated, in accordance with an exemplary embodiment.

In FIG. 3, the first end 122A of the center wing section 106 of the aircraft wing 104 is attached to the first outboard wing section 108A of the aircraft wing 104. FIG. 3 also depicts a closeout panel 302A. The closeout panel 302A can provide access to a first truss system, such as a first occurrence of the truss system 500 of FIG. 5, which attaches the center wing section 106 of the aircraft wing 104 to the first outboard wing section 108A of the aircraft wing 104.

Figure 4:
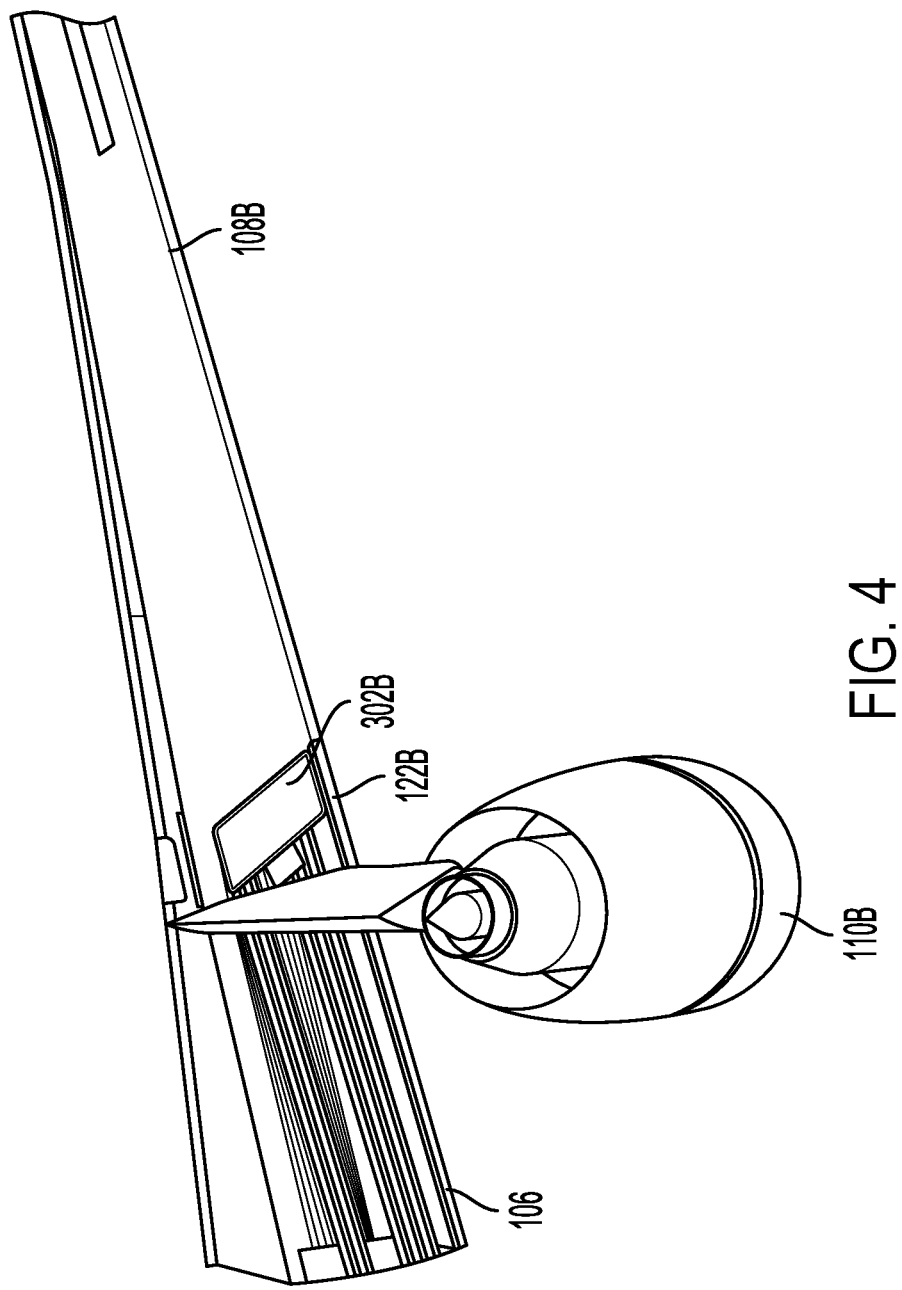
FIG. 4 illustrates a bottom portion of an aircraft wing on a second side of a fuselage, according to an exemplary embodiment.

Referring to FIG. 4, a bottom portion of the aircraft wing 104 on the second side 120B of the aircraft fuselage 102 is illustrated, in accordance with an exemplary embodiment.

In FIG. 4, the second end 122B of the center wing section 106 of the aircraft wing 104 is attached to the second outboard wing section 108B of the aircraft wing 104. FIG. 3 also depicts a closeout panel 302B. The closeout panel 302B can provide access to a second truss system, such as a second occurrence of the truss system 500 of FIG. 5, which attaches the center wing section 106 of the aircraft wing 104 to the second outboard wing section 108B of the aircraft wing 104.

Figure 5:
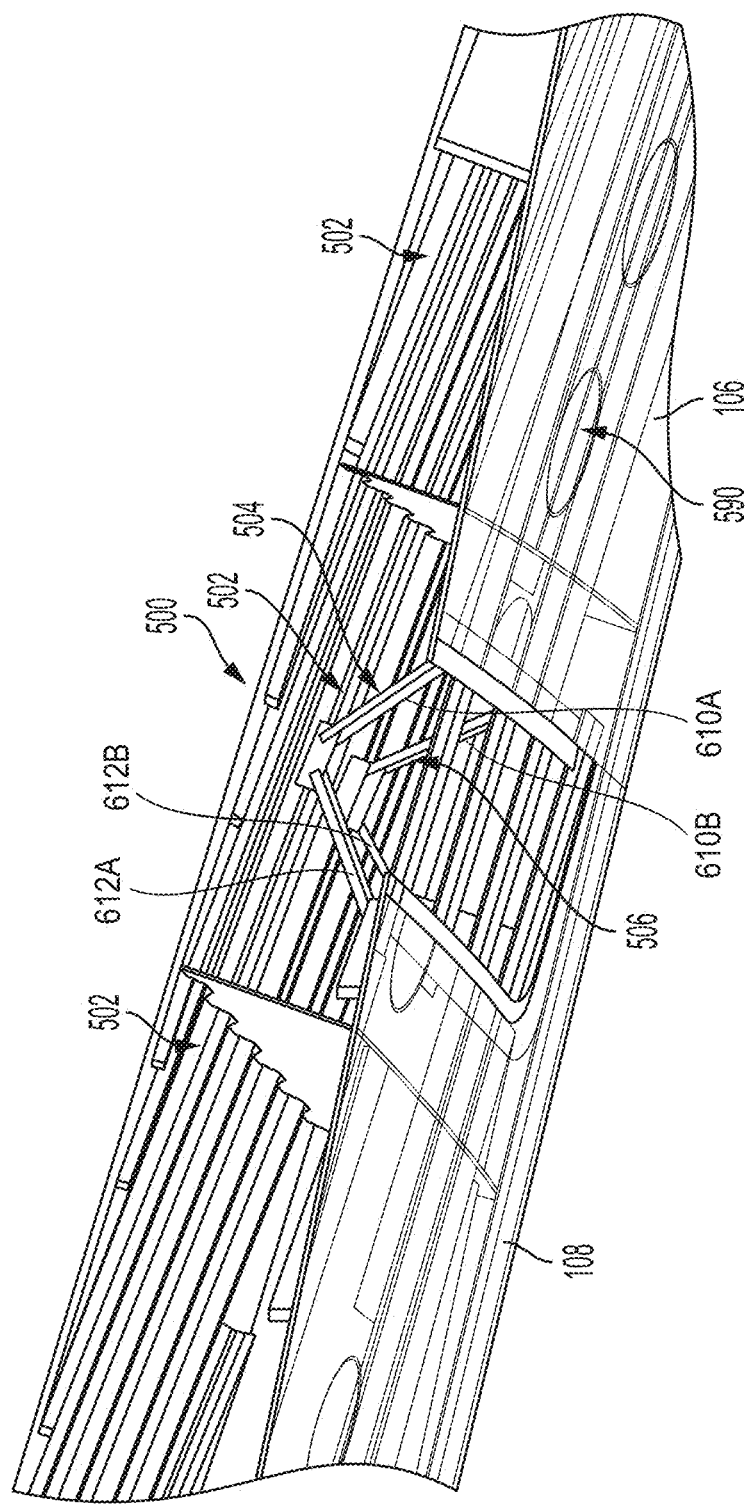
FIG. 5 illustrates a truss system that attaches a center wing section of an aircraft wing to an outboard wing section of the aircraft wing, according to an exemplary embodiment.

Referring to FIG. 5, a truss system 500 that attaches the center wing section 106 of the aircraft wing 104 to the outboard wing section 108 of the aircraft wing 104 is illustrated, in accordance with an exemplary embodiment. The truss system 500 is an arrangement of struts configured in a triangular shape. In particular, the truss system 500 is a triangulated system of straight interconnected structural elements (e.g., members or struts) connected at nodes. The external forces applied to the truss system 500 and the reactions at the supports are generally applied at the nodes. The truss system 500 can be accessible by the closeout panel 302A when the outboard wing section 108 corresponds to the outboard wing section 108A on the first side 120A of the aircraft fuselage 102. For example, truss system 500 can be accessible by an access panel opening 590 associated with the closeout panel 302A. Alternatively, the truss system 500 can be accessible by the closeout panel 302B when the outboard wing section 108 corresponds to the outboard wing section 108B on the second side 120B of the aircraft fuselage 102. For example, truss system 500 can be accessible by an access panel opening 590 associated with the closeout panel 302B.

The truss system 500 includes one or more stringers 502 (e.g., a plurality of stringers 502) that run along the aircraft wing 104. The stringers 502 or stiffeners can correspond to thin strips of materials or beams that run span-wise along the aircraft wing 104 and are attached to the ribs of the aircraft wing 104. Because the center wing section 106 is coupled to outboard wing section 108, the center wing section 106 and the outboard wing section 108 can include stringers 502 that are coupled together by the struts 504, 506, as described below.

The truss system 500 also includes one or more front struts 504. The front struts 504 are coupled to the stringers 502 that run along a top portion of the aircraft wing 104 and along a bottom portion of the aircraft wing 104. To couple center wing section 106 to the outboard wing section 108, the one or more front struts 504 of the truss system 500 are coupled to the stringers 502 that run along the center wing section 106 of the aircraft wing 104 and to the stringers 502 that run along the outboard wing section 108 of the aircraft wing 104. As illustrated in FIG. 5, the front struts 504 can be comprised of members that are coupled together via fasteners. The members of the struts 504 can be comprised of metal, wood, or a composite material.

The truss system 500 also includes one or more rear struts 506. The rear struts 506 are coupled to the stringers 502 that run along a top portion of the aircraft wing 104 and along a bottom portion of the aircraft wing 104. To couple center wing section 106 to the outboard wing section 108, the one or more rear struts 506 of the truss system 500 are coupled to the stringers 502 that run along the center wing section 106 of the aircraft wing 104 and to the stringers 502 that run along the outboard wing section 108 of the aircraft wing 104. As illustrated in FIG. 5, the rear struts 506 can be comprised of members that are coupled together via fasteners. The members of the rear struts 506 can be comprised of metal, wood, or a composite material.

A load can be transferred along the one or more stringers 502, the one or more front struts 504, and the one or more rear struts 506 of the truss system 500.

Figure 6:
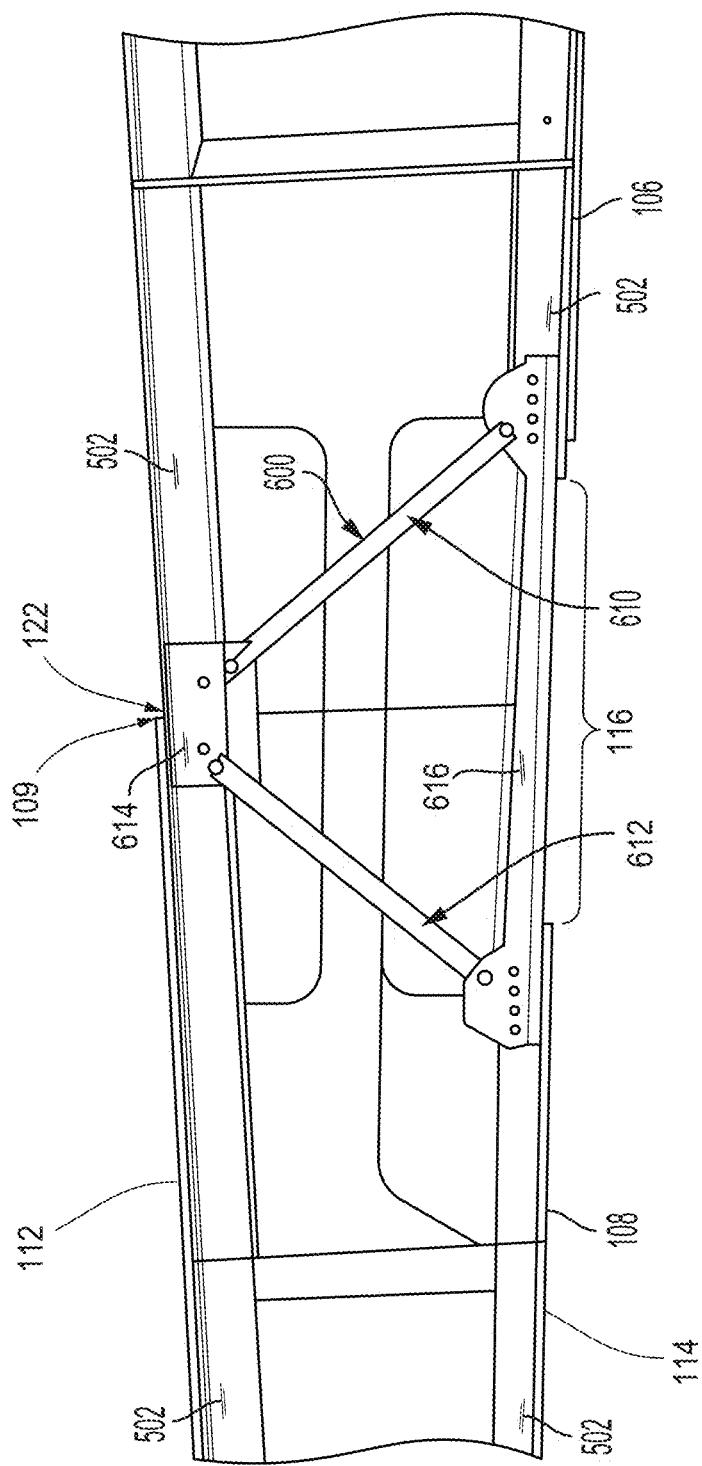
FIG. 6 illustrates another truss system that attaches a center wing section of an aircraft wing to an outboard wing section of the aircraft wing, according to an exemplary embodiment.

Referring to FIG. 6, another truss system 600 that attaches the center wing section 106 of the aircraft wing 104 to the outboard wing section 108 of the aircraft wing 104 is illustrated, in accordance with an exemplary embodiment. In one embodiment, the truss system 600 can correspond to the truss system 500 of FIG. 5. The truss system 600 can be accessible by the closeout panel 302A when the outboard wing section 108 corresponds to the outboard wing section 108A on the first side 120A of the aircraft fuselage 102. Alternatively, the truss system 600 can be accessible by the closeout panel 302B when the outboard wing section 108 corresponds to the outboard wing section 108B on the second side 120B of the aircraft fuselage 102.

The truss system 600 includes the one or more stringers 502 (e.g., a plurality of stringers 502) that run along the aircraft wing 104. The truss system 500 also includes one or more center wing section struts 610 and outboard wing section struts 612. The struts 610, 612 in the truss system 600 can correspond to the front struts 504 in the truss system 500 of FIG. 5, the rear struts 506 in the truss system 500 of FIG. 5, or both. The center wing section struts 610 and outboard wing section struts 612 are coupled to the stringers 502 that run along a top portion 112 of the aircraft wing 104 and along a bottom portion 114 of the aircraft wing 104. To couple center wing section 106 to the outboard wing section 108, the one or more center wing section struts 610 and outboard wing section struts 612 of the truss system 600 are coupled to the stringers 502 that run along the center wing section 106 of the aircraft wing 104 and to the stringers 502 that run along the outboard wing section 108 of the aircraft wing 104.

More particularly, as shown in FIG. 6, the center wing section 106 and the outboard wing sections 108 each have a top portion 112 and a bottom portion 114 each having one or more stringers 502. At least one stringer 502 on the bottom portion 114 of the center wing section 106 terminates at a spaced distance from at least one stringer 502 on the bottom portion 114 of an outboard wing section 108 to define a spanwise stringer gap 116 at the location of the closeout panel (e.g., the closeout panel 302A of FIG. 3). Each truss system 600 includes an upper fitting 614 coupling a stringer 502 on the top portion 112 of the center wing section 106 to a stringer 502 on the top portion 112 of an outboard wing section 108. In addition, each truss system 600 includes a lower fitting 616 extending across the spanwise stringer gap 116 and interconnecting a stringer 502 on the bottom portion 114 of the center wing section 106 to a stringer 502 on the bottom portion 114 of an outboard wing section 108. Additionally, In addition, each truss system 600 includes a center wing section strut 610 extending between the upper fitting 614 and the lower fitting 616 at the center wing section end 122. Furthermore, In addition, each truss system 600 includes an outboard wing section strut 612 extending between the upper fitting 614 and the lower fitting 616 at the inboard end 109 of the outboard wing section 108. In the example of FIG. 5, the truss system 500 comprises a front center wing section strut 610A, a front outboard wing section strut 612A, a rear center wing section strut 610B, and a rear outboard wing section strut 612B. A load can be transferred along the one or more stringers 502 and the one or more center wing section struts 610 and outboard wing section struts 612 of the truss system 600.

Figure 7:
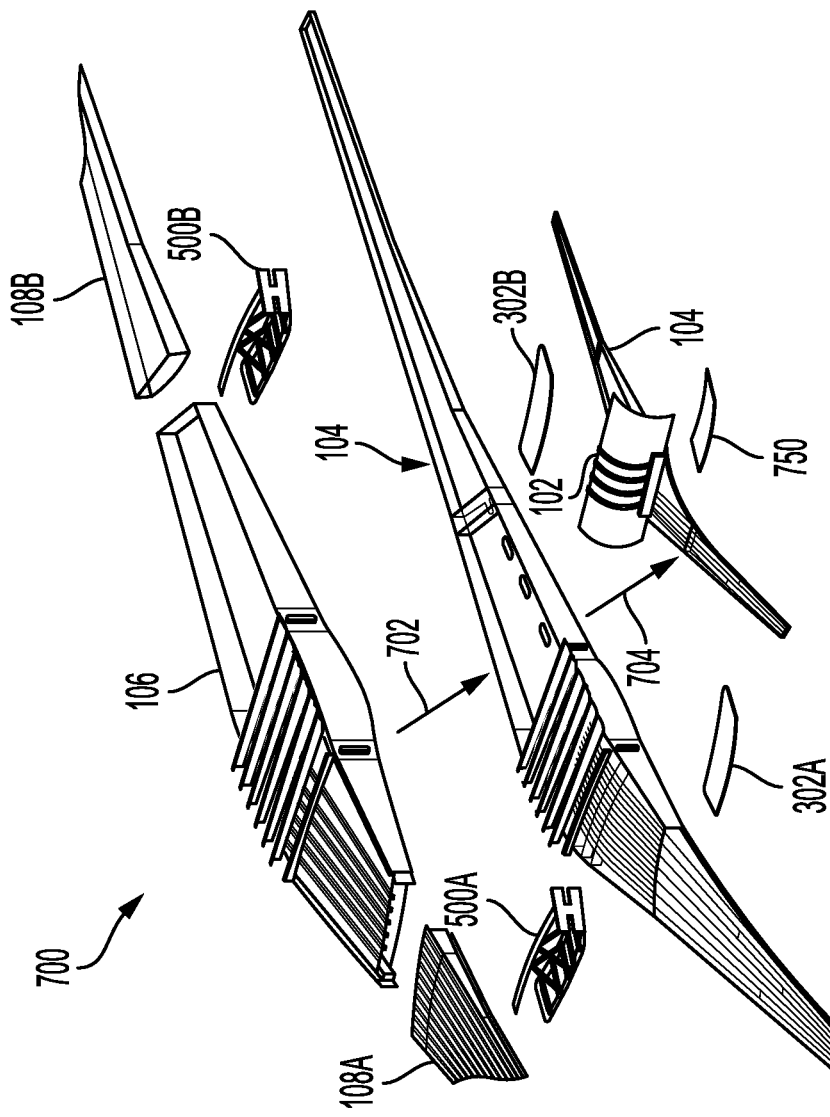
FIG. 7 illustrates a process for constructing an aircraft wing and attaching the aircraft wing to a fuselage, in accordance with an exemplary embodiment.

Referring to FIG. 7, a process 700 for constructing an aircraft wing and attaching the aircraft wing to a fuselage is illustrated, in accordance with an exemplary embodiment.

According to a first stage 702 of the process 700, the aircraft wing 104 is constructed (e.g., assembled). For example, during the first stage 702, the center wing section 106 of the aircraft wing 104 is attached to the outboard wing section 108A by a first truss system 500A. The first truss system 500A is accessible via the first closeout panel 302A. Additionally, during the first stage 702, the center wing section 106 of the aircraft wing 104 is attached to the outboard wing section 108B by a second truss system 500B. The second truss system 500B is accessible via the second closeout panel 302B.

According to a second stage 704 of the process 700, the aircraft wing 104 is attached to the aircraft fuselage 102. The second stage 704 is described below in greater detail with respect to FIGS. 9-13. As illustrated in FIG. 7, a center wing closeout panel 750 can be used to access a center wing access panel opening 802, as described in greater detail with respect to FIG. 8. The center wing closeout panel 750 can have external fasteners aligned to truss members inside the center wing section 106 of the aircraft wing 104. As a result, the center wing closeout panel 750 can have a smooth fitting with the center wing section 106 with respect to external fasteners.

Figure 8:
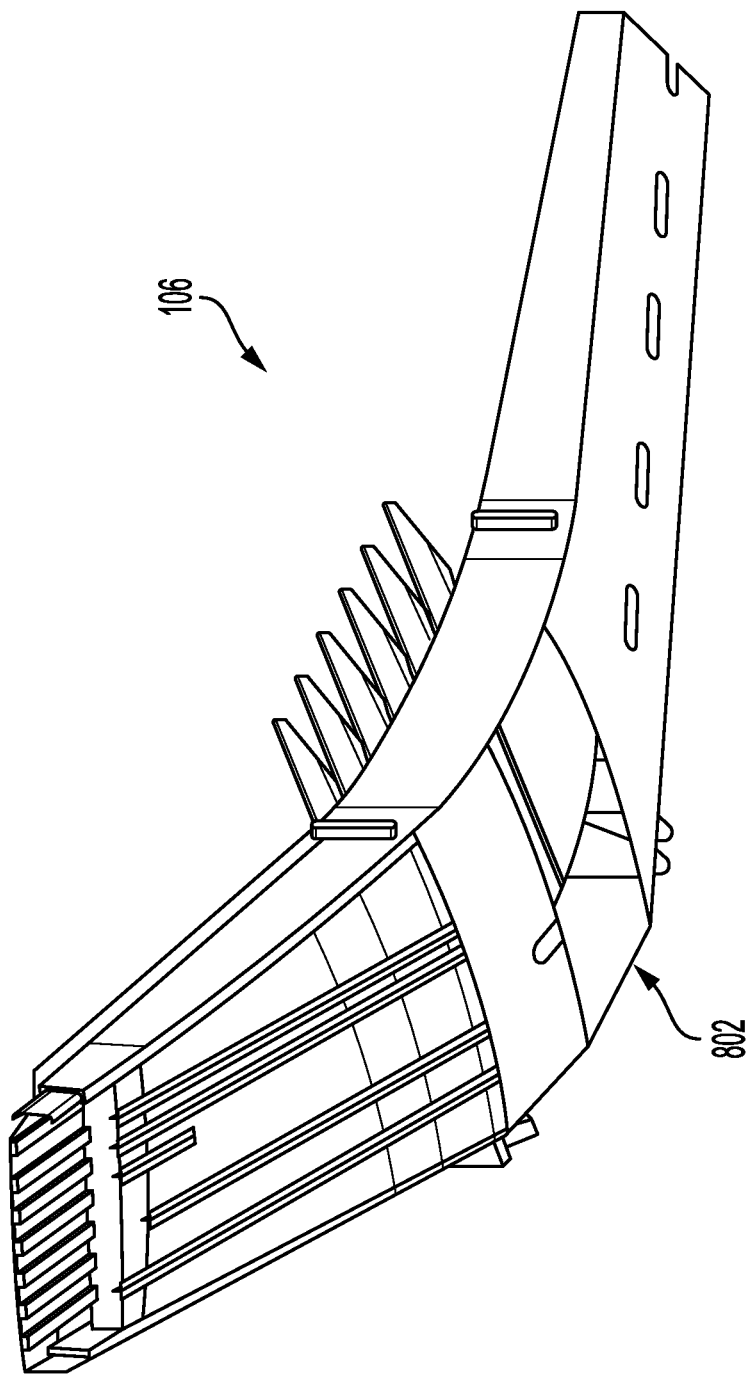
FIG. 8 illustrates a bottom view of a center wing section of an aircraft wing, in accordance with an exemplary embodiment.

Referring to FIG. 8, a bottom view of the center wing section 106 of the aircraft wing 104 is illustrated, in accordance with an exemplary embodiment.

The center wing section 106 of the aircraft wing 104 includes at least one center wing access panel opening 802. The center wing access panel opening 802 can be accessible via the center wing closeout panel 750. With respect to the layout and configuration of the aircraft wing 104, the center wing access panel opening 802 is between a first access panel opening associated with the first closeout panel 302A (e.g., an access panel opening to access the truss system 500A) and a second access panel opening associated with the second closeout panel 302B (e.g., an access panel opening to access the truss system 500B).

As described above, internal structure and systems related to the engines 110 and fuel management can be included within the continuous center wing section 106 of the aircraft wing 104. The center wing access panel opening 802 can provide a relatively large area for personnel to access the internal structure and systems included within the continuous center wing section 106. In particular, at least one aircraft system can be accessible via the at least one center wing access panel opening 802. As a non-limiting example, a fuel system can be accessible via the at least one center wing access panel opening 802. Thus, the layout of the center wing access panel opening 802 can improve the feasibility of maintenance operations for internal structure and systems.

Figure 9:
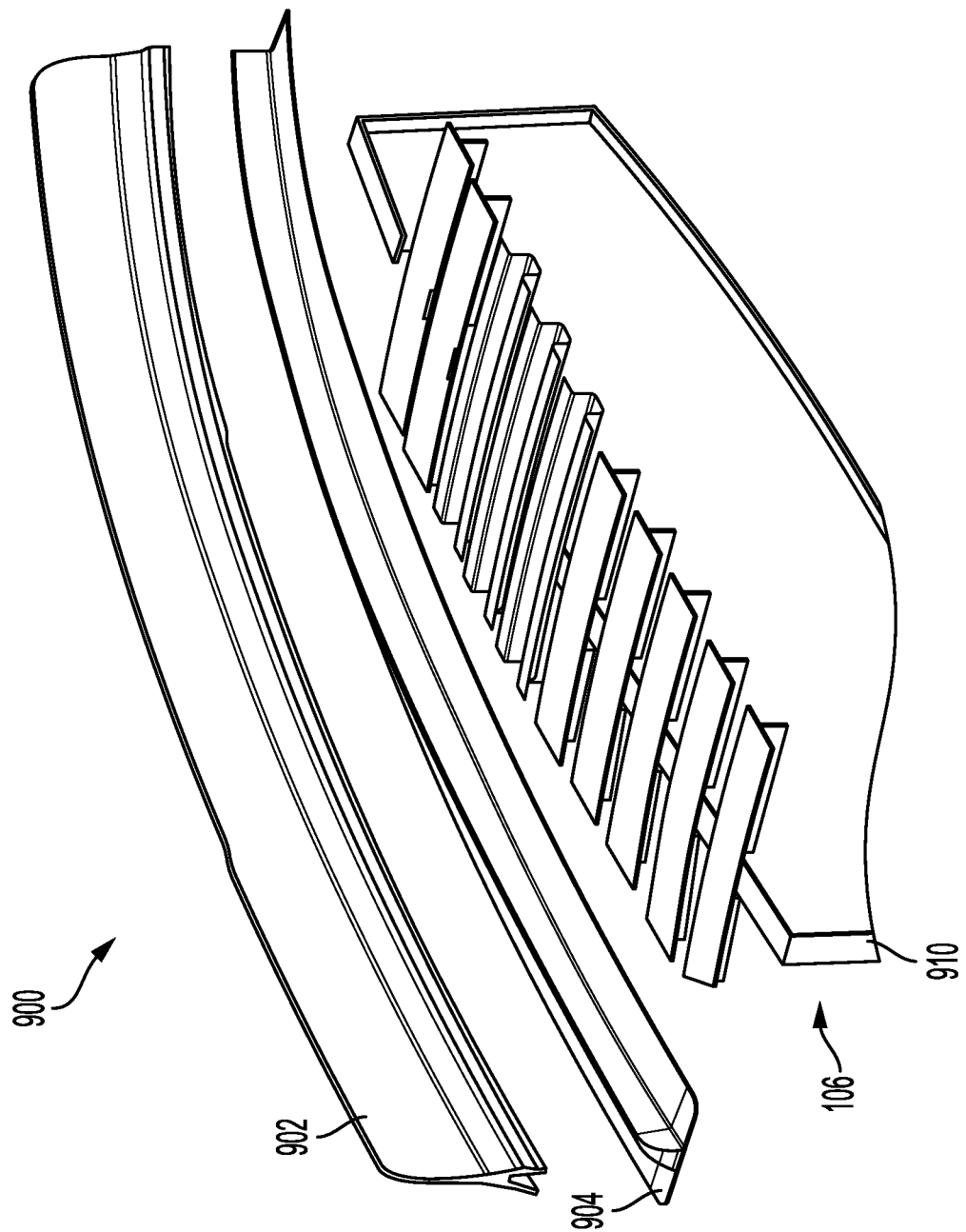
FIG. 9 illustrates a process for attaching an aircraft wing to a fuselage, in accordance with an exemplary embodiment.

Referring to FIG. 9, a process 900 for attaching an aircraft wing to a fuselage is illustrated, in accordance with an exemplary embodiment.

According to the process 900, a closed-shaped bracket 904 is coupled to the center wing section 106 of the aircraft wing 104. For example, a plurality of fasteners can be used to couple the closed-shaped bracket 904 to a rib 910 of the center wing section 106 of the aircraft wing 104. As illustrated in FIG. 9, a center portion of the closed-shaped bracket 904 can have the shape of an upside-down letter "V". For example, the center portion of the closed-shaped bracket 904 can have an apex that is comprised from slanted members of the closed-shaped bracket 904 meeting.

According to the process 900, an open-shaped bracket 902 is coupled to a side of the aircraft fuselage 102 (not shown in FIG. 9). For example, a plurality of fasteners can be used to couple the open-shaped bracket 902 to the aircraft fuselage 102. As illustrated in FIG. 9, a center portion of the open-shaped bracket 902 can have an opening that is shaped to fit the center portion of the closed-shaped bracket 904. For example, the center portion of the open-shaped bracket 902 can have the shape of an upside-down letter "Y".

To attach the aircraft wing 104 (e.g., the center wing section 106 of the aircraft wing 104) to the aircraft fuselage 102, the process 900 facilitates the attachment of the open-shaped bracket 902 to the closed-shaped bracket 904. For example, the apex of the closed-shaped bracket 904 is inserted into the opening of the open-shaped bracket 902. Afterwards, a plurality of fasteners couple the open-shaped bracket 902 to the closed-shaped bracket 904. For example, the fasteners can penetrate the opening of the open-shaped bracket 902, the members forming the apex of the closed-shaped bracket 904, and the aircraft fuselage 102, as depicted in FIGS. 10 and 11.

By inserting the apex of the closed-shaped bracket 904 into the opening of the open-shaped bracket 902, a smaller number of fasteners can be used to attach the aircraft wing 104 to the aircraft fuselage 102. For example, inserting the apex of the closed-shaped bracket 904 into the opening of the open-shaped bracket 902 can provide added support that reduces the need to have a relatively large amount of fasteners to ensure that the aircraft wing 104 is adequately attached to the aircraft fuselage 102.

Figure 10:
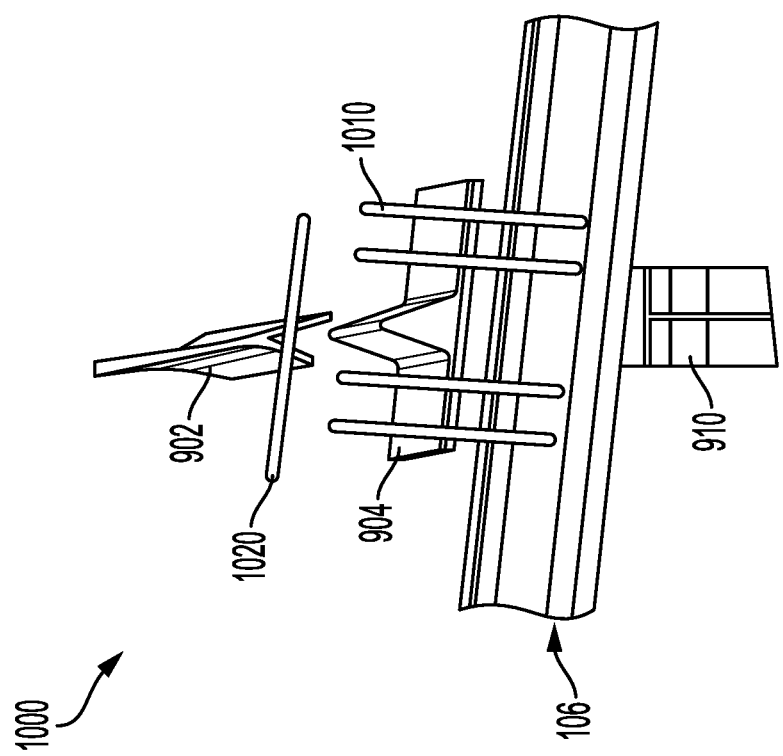
FIG. 10 illustrates another process for attaching an aircraft wing to a fuselage, in accordance with an exemplary embodiment.
Figure 11:
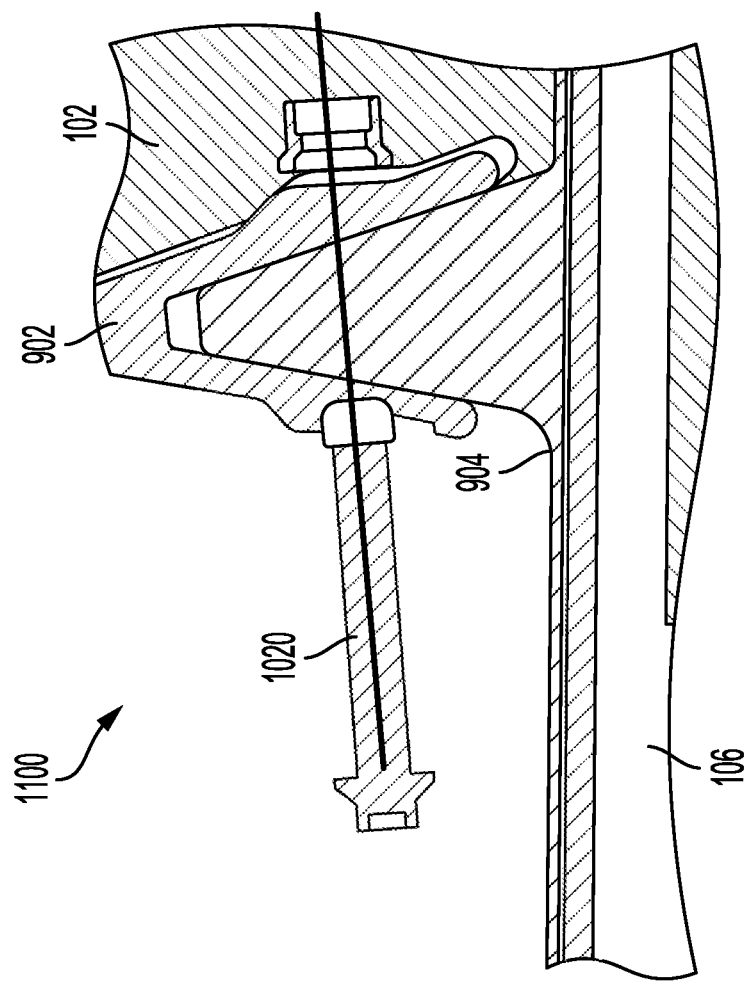
FIG. 11 illustrates another process for attaching an aircraft wing to a fuselage, in accordance with an exemplary embodiment.

Referring to FIG. 10, another process 1000 for attaching an aircraft wing to a fuselage is illustrated, in accordance with an exemplary embodiment.

According to the process 1000, the closed-shaped bracket 904 is coupled to the center wing section 106 of the aircraft wing 104. For example, a plurality of fasteners 1010 can be used to couple the closed-shaped bracket 904 to the rib 910 of the center wing section 106 of the aircraft wing 104. According to the process 1000, the open-shaped bracket 902 is coupled to a side of the aircraft fuselage 102 (not shown in FIG. 10). For example, a plurality of fasteners (not shown in FIG. 10) can be used to couple the open-shaped bracket 902 to the aircraft fuselage 102.

To attach the aircraft wing 104 (e.g., the center wing section 106 of the aircraft wing 104) to the aircraft fuselage 102, the process 1000 facilitates the attachment of the open-shaped bracket 902 to the closed-shaped bracket 904. For example, the apex of the closed-shaped bracket 904 is inserted into the opening of the open-shaped bracket 902. Afterwards, a plurality of fasteners 1020 couple the open-shaped bracket 902 to the closed-shaped bracket 904. For example, the fasteners 1020 can penetrate the opening of the open-shaped bracket 902, the members forming the apex of the closed-shaped bracket 904, and the aircraft fuselage 102.

By inserting the apex of the closed-shaped bracket 904 into the opening of the open-shaped bracket 902, a smaller number of fasteners 1020 can be used to attach the aircraft wing 104 to the aircraft fuselage 102. For example, inserting the apex of the closed-shaped bracket 904 into the opening of the open-shaped bracket 902 can provide added support that reduces the need to have a relatively large amount of fasteners to ensure that the aircraft wing 104 is adequately attached to the aircraft fuselage 102.

Referring to FIG. 11, another process 1100 for attaching an aircraft wing to a fuselage is illustrated, in accordance with an exemplary embodiment.

According to the process 1100, the closed-shaped bracket 904 is coupled to the center wing section 106 of the aircraft wing 104, and the open-shaped bracket 902 is coupled to a side of the aircraft fuselage 102. To attach the aircraft wing 104 (e.g., the center wing section 106 of the aircraft wing 104) to the aircraft fuselage 102, the process 1100 facilitates the attachment of the open-shaped bracket 902 to the closed-shaped bracket 904. For example, the apex of the closed-shaped bracket 904 is inserted into the opening of the open-shaped bracket 902. Afterwards, a plurality of fasteners 1020 couple the open-shaped bracket 902 to the closed-shaped bracket 904. For example, the fasteners 1020 can penetrate the opening of the open-shaped bracket 902, the members forming the apex of the closed-shaped bracket 904, and the aircraft fuselage 102. Although a single fastener 1020 is depicted in FIG. 11, in other embodiments, multiple fasteners 1020 can be used to couple the brackets 902, 904 to the aircraft fuselage 102. As a non-limiting example, in one embodiment, twenty-eight (28) fasteners 1020 (e.g., through bolts) can be used to couple the brackets 902, 904 to the aircraft fuselage 102.

By inserting the apex of the closed-shaped bracket 904 into the opening of the open-shaped bracket 902, a smaller number of fasteners 1020 can be used to attach the aircraft wing 104 to the aircraft fuselage 102. For example, inserting the apex of the closed-shaped bracket 904 into the opening of the open-shaped bracket 902 can provide added support that reduces the need to have a relatively large amount of fasteners to ensure that the aircraft wing 104 is adequately attached to the aircraft fuselage 102.

Figure 12:
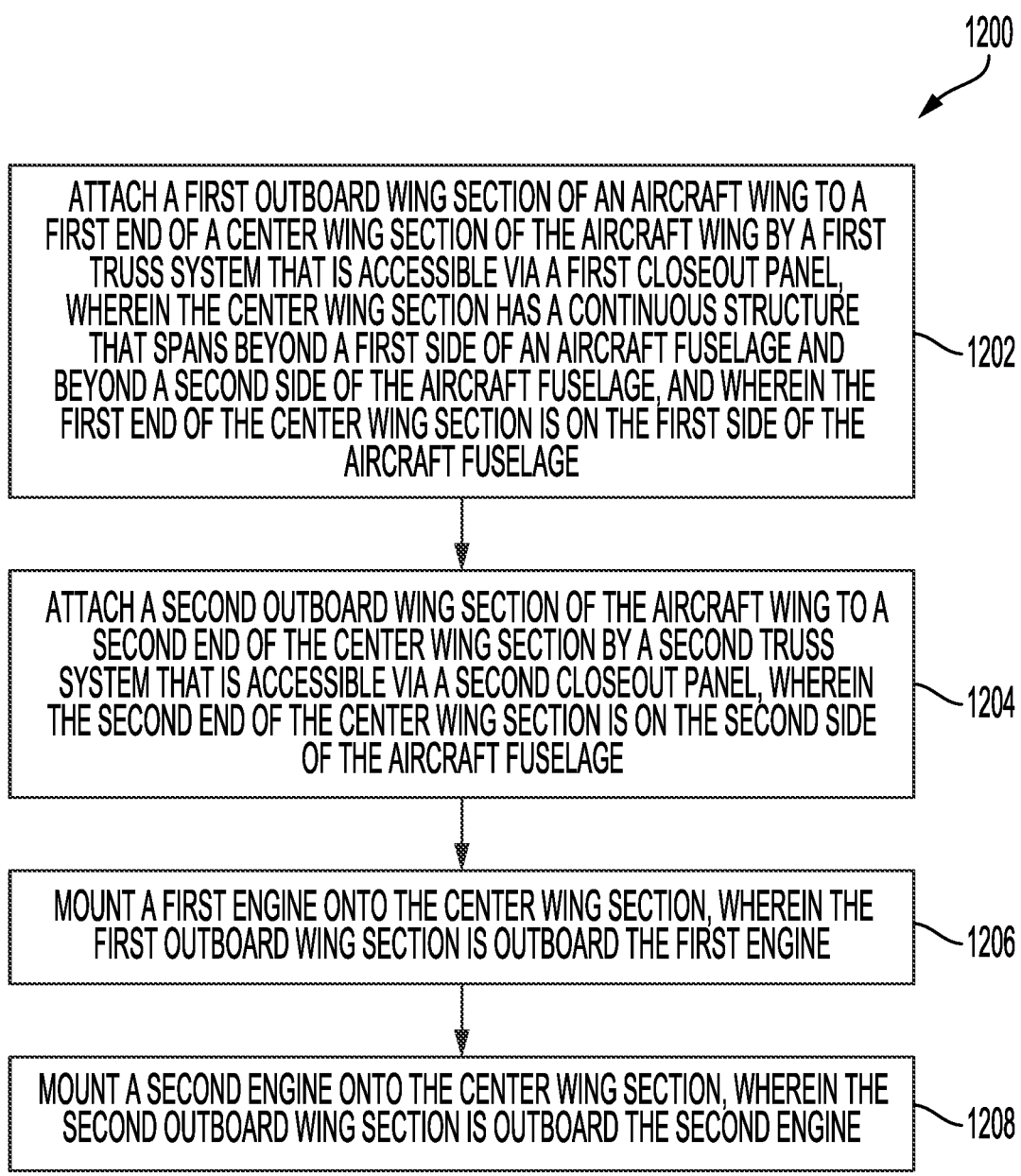
FIG. 12 is a flowchart of an example of an implementation of a method, according to an exemplary embodiment.

FIG. 12 illustrates a flow chart of a method 1200, according to an exemplary embodiment.

The method 1200 includes attaching a first outboard wing section of an aircraft wing to a first end of a center wing section of the aircraft wing by a first truss system that is accessible via a first closeout panel, at block 1202. The center wing section has a continuous structure that spans beyond a first side of an aircraft fuselage and beyond a second side of the aircraft fuselage, and the first end of the center wing section is on the first side of the aircraft fuselage. For example, referring to FIGS. 1 and 7, the first outboard wing section 108A of the aircraft wing 104 is attached to the first end 122A of the center wing section 106 of the aircraft wing 104 by the first truss system 500A that is accessible via the first closeout panel 302A. The center wing section 106 has a continuous structure that spans beyond the first side 120A of the aircraft fuselage 102 and beyond the second side 120B of the aircraft fuselage 102, and the first end 122A of the center wing section 106 is on the first side 120A of the aircraft fuselage 102.

The method 1200 also includes attaching a second outboard wing section of the aircraft wing to a second end of the center wing section by a second truss system that is accessible via a second closeout panel, at block 1204. The second end of the center wing section is on the second side of the aircraft fuselage. For example, referring to FIGS. 1 and 7, the second outboard wing section 108B of the aircraft wing 104 is attached to the second end 122B of the center wing section 106 by the second truss system 500B that is accessible via the second closeout panel 302B. The second end 122B of the center wing section 106 is on the second side 120B of the aircraft fuselage 102.

The method 1200 also includes mounting a first engine onto the center wing section, at block 1206. The first outboard wing section is outboard the first engine. For example, referring to FIG. 1, the first engine 110A is mounted onto the center wing section 106. The first outboard wing section 108A is outboard the first engine 110A.

The method 1200 also includes mounting a second engine onto the center wing section, at block 1208. The second outboard wing section is outboard the second engine. For example, referring to FIG. 1, the second engine 110B is mounted onto the center wing section 106. The second outboard wing section 108B is outboard the second engine 110B.

According to one implementation of the method 1200, the first truss system 500A includes, at least, one or more stringers 502, one or more front struts 504, and one or more rear struts 506. A first load can be transferred along the one or more stringers 502, the one or more front struts 504, and the one or more rear struts 506. The first truss system 500A can be accessible through a first access panel opening (e.g., the access panel opening 590) associated with the first closeout panel 302A.

According to one implementation of the method 1200, the second truss system 500B includes, at least, one or more stringers 502, one or more front struts 504, and one or more rear struts 506. A second load can be transferred along the one or more stringers 502, the one or more front struts 504, and the one or more rear struts 506. The second truss system 500B can be accessible through a second access panel opening (e.g., the access panel opening 590) associated with the second closeout panel 302B.

According to one implementation, the method 1200 includes coupling a first open-shaped bracket to the first side of the aircraft fuselage and coupling a first closed-shaped bracket to the center wing section at a first location proximate to the first side of the aircraft fuselage. For example, the open-shaped bracket 902 can be coupled to the first side 120A of the aircraft fuselage 102 and the closed-shaped bracket 904 can be coupled to the center wing section 106 at a first location proximate to the first side 120A of the aircraft fuselage 102. The method 1200 can also include coupling the first open-shaped bracket to the first closed-shaped bracket. For example, the fasteners 1020 can couple the open-shaped bracket 902 to the closed-shaped bracket 904.

According to one implementation, the method 1200 includes coupling a second open-shaped bracket to the second side of the aircraft fuselage and coupling a second closed-shaped bracket to the center wing section at a second location proximate to the second side of the aircraft fuselage. For example, the open-shaped bracket 902 can be coupled to the second side 120B of the aircraft fuselage 102 and the closed-shaped bracket 904 can be coupled to the center wing section 106 at a second location proximate to the second side 120B of the aircraft fuselage 102. The method 1200 can also include coupling the second open-shaped bracket to the second closed-shaped bracket. For example, the fasteners 1020 can couple the open-shaped bracket 902 to the closed-shaped bracket 904.

According to one implementation of the method 1200, the center wing section 106 includes at least one center wing access panel opening 802 that is accessible via a center wing closeout panel 750. The at least one center wing access panel opening 802 is between a first access panel opening associated with the first closeout panel 302A and a second access panel opening associated with the second closeout panel 302B. According to one implementation of the method 1200, at least one aircraft system is accessible via the at least one center wing access panel opening 802. According to one implementation of the method 1200, a fuel system is accessible via the at least one center wing access panel opening 802.

By constructing the aircraft wing 104 such that the outboard wing sections 108 are outboard the engines 110, internal structure and systems related to the engines 110 and fuel management can be included within the continuous center wing section 106 of the aircraft wing 104. Additionally, by using a continuous center wing section 106 that extends beyond the aircraft fuselage 102, there are less interfaces (e.g., stringers) that need to carry the load through the outboard wing sections 108, which can lead to less fasteners. For example, because of the continuous nature of the center wing section 106, the center wing section 106 can carry a relatively large load with a reduced amount of fasteners compared to a smaller center wing section that does not extend beyond the aircraft fuselage 102.

Although the systems are described herein with specific reference to aircraft systems or aerospace vehicles, in other embodiments, the system can be a vehicle other than an aircraft without departing from the essence of the present disclosure.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. An aircraft structure comprising:
   an aircraft wing comprising:
   a center wing section having a continuous structure that spans beyond opposite sides of an aircraft fuselage and which terminates respectively at center wing section ends;
   a pair of outboard wing sections each having an inboard end, and each outboard wing section is attached to a center wing section end by a truss system that is accessible via a closeout panel;
   wherein:
      the center wing section and the outboard wing sections each have a top portion and a bottom portion each having one or more span-wise extending stringers;
      at least one stringer on the bottom portion of the center wing section terminates at a spaced distance from at least one stringer on the bottom portion of an outboard wing section to define a spanwise stringer gap at the location of the closeout panel;
      each truss system comprises:
         an upper fitting coupling a stringer on the top portion of the center wing section to a stringer on the top portion of an outboard wing section;
         a lower fitting extending across the spanwise stringer gap and interconnecting a stringer on the bottom portion of the center wing section to a stringer on the bottom portion of an outboard wing section;
         a center wing section strut extending between the upper fitting and the lower fitting at the center wing section end; and
         an outboard wing section strut extending between the upper fitting and the lower fitting at the inboard end of the outboard wing section.

2. The aircraft structure of claim 1, further comprising:
   a pair of engines mounted onto the center wing section respectively on the opposite sides of the fuselage, wherein each of the outboard wing sections is outboard of one of the engines.

3. The aircraft structure of claim 1, wherein the truss system comprises, at least, a front center wing section strut, a front outboard wing section strut, a rear center wing section strut, and a rear outboard wing section strut.

4. The aircraft structure of claim 1, wherein a load is transferred along the one or more stringers, the center wing section strut and the outboard wing section strut.

5. The aircraft structure of claim 1, wherein the truss system is accessible through an access panel opening associated with the closeout panel.

6. The aircraft structure of claim 1, further comprising:
   an open-shaped bracket coupled to one of the sides of the aircraft fuselage; and
   a closed-shaped bracket coupled to the center wing section, wherein an apex of the closed-shaped bracket is inserted into an opening of the open-shaped bracket.

7. The aircraft structure of claim 6, further comprising:
   a plurality of fasteners that couple the open-shaped bracket to the closed-shaped bracket.

8. The aircraft structure of claim 1, wherein the center wing section comprises at least one center wing access panel opening that is accessible via a center wing closeout panel, and wherein the at least one center wing access panel opening is between a pair of the access panel openings of the closeout panels respectively associated with the pair of outboard wing sections.

9. The aircraft structure of claim 8, wherein at least one aircraft system is accessible via the at least one center wing access panel opening.

10. The aircraft structure of claim 8, wherein a fuel system is accessible via the at least one center wing access panel opening.

11. An aircraft comprising:
    a fuselage;
    an aircraft wing as claimed in claim 1; and
    a pair of engines mounted onto the center wing section respectively on the opposite sides of the fuselage, wherein each of the outboard wing sections is outboard of one of the engines.

12. The aircraft of claim 11, further comprising:
    an open-shaped bracket coupled to one of the sides of the aircraft fuselage; and
    a closed-shaped bracket coupled to the center wing section, wherein an apex of the closed-shaped bracket is inserted into an opening of the open-shaped bracket.

13. The aircraft of claim 12, further comprising:
    a plurality of fasteners that couple the open-shaped bracket to the closed-shaped bracket.

14. The aircraft of claim 11, wherein the center wing section comprises at least one center wing access panel opening that is accessible via a center wing closeout panel, and wherein the at least one center wing access panel opening is between a pair of the access panel openings of the closeout panels respectively associated with the pair of outboard wing sections.

15. A method of fabricating an aircraft structure, the method comprising:
    attaching an inboard end of each of a pair of outboard wing sections of an aircraft wing to one of a pair of center wing section ends of a center wing section of the aircraft wing by a truss system that is accessible via a closeout panel, wherein the center wing section has a continuous structure that spans beyond opposite sides of an aircraft fuselage and which terminates respectively at the center wing section ends;
    wherein:
       the center wing section and the outboard wing sections each have a top portion and a bottom portion each having one or more span-wise extending stringers;
       at least one stringer on the bottom portion of the center wing section terminates at a spaced distance from at least one stringer on the bottom portion of an outboard wing section to define a spanwise stringer gap at the location of the closeout panel;
       each truss system comprises:
          an upper fitting coupling a stringer on the top portion of the center wing section to a stringer on the top portion of an outboard wing section;

a lower fitting extending across the spanwise stringer gap and interconnecting a stringer on the bottom portion of the center wing section to a stringer on the bottom portion of an outboard wing section;

a center wing section strut extending between the upper fitting and the lower fitting at the center wing section end; and an outboard wing section strut extending between the upper fitting and the lower fitting at the inboard end of the outboard wing section mounting a pair of engines onto the center wing section respectively on the opposite sides of the fuselage, wherein each of the outboard wing sections is outboard of one of the engines.

16. The method of claim 15, wherein the truss system comprises, at least, a front center wing section strut, a front outboard wing section strut, a rear center wing section strut, and a rear outboard wing section strut.

17. The method of claim 16, wherein a load is transferred along the one or more stringers, the center wing section strut, and the outboard wing section strut.

18. The method of claim 15, wherein the truss system is accessible through an access panel opening associated with the closeout panel.

19. The method of claim 15, further comprising:
coupling an open-shaped bracket to one of the sides of the aircraft fuselage; and
coupling a closed-shaped bracket to the center wing section at a first location proximate to the side of the aircraft fuselage, wherein an apex of the closed-shaped bracket is inserted into an opening of the open-shaped bracket.

20. The method of claim 19, further comprising:
coupling the open-shaped bracket to the closed-shaped bracket using a plurality of fasteners.

* * * * *